United States Patent
Yang et al.

[11] Patent Number: 5,905,730
[45] Date of Patent: May 18, 1999

[54] HIGH SPEED PACKET SCHEDULING METHOD AND APPARATUS

[75] Inventors: Tao Yang, Belleville, Canada; Mahesh N. Ganmukhi, Carlisle, Mass.

[73] Assignee: Ascend Communications, Inc., Westford, Mass.

[21] Appl. No.: 09/049,510

[22] Filed: Mar. 27, 1998

Related U.S. Application Data

[60] Provisional application No. 60/042,943, Apr. 4, 1997.

[51] Int. Cl.$^6$ .............................. H04L 12/54; H04Q 11/04
[52] U.S. Cl. ......................... 370/429; 370/235; 370/412; 370/395
[58] Field of Search ................................... 370/411, 412, 370/413, 414, 415, 416, 417, 418, 395, 252, 428, 429, 235, 230, 231, 232; 395/200.57, 200.58, 200.59, 200.65

[56] References Cited

U.S. PATENT DOCUMENTS

| | | | |
|---|---|---|---|
| 5,455,825 | 10/1995 | Lauer et al. | 370/413 |
| 5,533,020 | 7/1996 | Byrn et al. | 370/412 |
| 5,689,508 | 11/1997 | Lyles | 370/312 |
| 5,748,614 | 5/1998 | Wallmeier | 370/312 |

Primary Examiner—Chi H. Pham
Assistant Examiner—Steven Nguyen
Attorney, Agent, or Firm—Weingarten, Schurgin, Gagnebin & Hayes LLP

[57] ABSTRACT

A packet scheduler is disclosed which provides a high degree of fairness in scheduling packets associated with different sessions. The scheduler also minimizes packet delay for packet transmission from a plurality of sessions which may have different requirements and may operate at different transfer rates. When a packet is received by the scheduler, the packet is assigned its own packet virtual start time based on whether the session has any pending packets and the values of the virtual finish time of the previous packet in the session and the packets arrival time. The scheduler then determines a virtual finish time of the packet by determining the transfer time required for the packet based upon its length and rate and by adding the transfer time to the packet virtual start time of the packet. The packet with the smallest virtual finish time is then scheduled for transfer. By selecting packets for transmission in the above described manner, the available bandwidth may be shared in pro-rata proportion to the guaranteed session rate, thereby providing a scheduler with a high degree of fairness while also minimizing the amount of time a packet waits in the scheduler before being served.

9 Claims, 11 Drawing Sheets

Fig. 8

| | System Parameters | | | | |
|---|---|---|---|---|---|
| | Test #1 | Test #2 | Test #3 | Test #4 | Test #5 |
| Link Rate (Mbps) | 6.4 | 3.44 | 82.5 | 155 | 155 |
| Total # of Sources | 100 | 100 | 130 | 66 | 255 |
| | Traffic Composition (Source Numbers) | | | | |
| CBR1 | 0-99 | | | 0-4 | 0-39 |
| CBR2 | | | | | 40-79 |
| CBR3 | | | | 5-9 | 80-95 |
| CBR4 | | | | 10-14 | |
| ABR1 | | | 120-129 | 15-19 | 96-100 |
| ABR2 | | | | 20-24 | 101-105 |
| ABR3 | | | | 25-29 | 106-110 |
| ABR4 | | | | | |
| ABR5 | | | | | |
| ABR6 | | | | | |
| VBR1 | | 0-99 | 0-99 | 30-33 | 111-150 |
| VBR2 | | | | 34-37 | 151-180 |
| VBR3 | | | | 38-41 | 181-220 |
| VBR4 | | | 100-119 | 42-45 | 221-224 |
| VBR5 | | | | 46-49 | 225-228 |
| VBR6 | | | | 50-53 | 229-232 |
| VBR7 | | | | 54-57 | 233-236 |
| VBR8 | | | | 58-61 | 237-240 |
| VBR9 | | | | 62-65 | 241-244 |

HIGH SPEED PACKET SCHEDULING METHOD AND APPARATUS

CROSS REFERENCE TO RELATED APPLICATIONS

This application claims priority of patent application Ser. No. 60/042,943 filed Apr. 4, 1997 which is incorporated herein by reference.

STATEMENT REGARDING FEDERALLY SPONSORED RESEARCH OR DEVELOPMENT

Not Applicable

BACKGROUND OF THE INVENTION

High speed packet networks, such as Asynchronous Transfer Mode (ATM) networks, support connections to multiple sessions which operate at different packet transfer rates. Packet scheduling must be handled such that packets are transferred from the different sessions with minimal delays, while maximizing the use of available bandwidth. Ideally, a scheduler should fairly arbitrate packets for delivery while being cost effective to implement. Many schedulers are known which are either simple to implement but do not fairly arbitrate between packets of different sessions, or provide fair arbitration but are costly to implement. A class of schedulers known as Packet Fair Queuing (PFQ) schedulers (described below) are cost effective to implement and include Virtual Clock (VC) schedulers, Self Clocked Fair Queuing (SCFQ) schedulers, Start Time Fair Queuing (STFQ) schedulers and Deficit Round Robin Fair Queuing (DRRFQ) schedulers.

VC schedulers provide every session with a guaranteed throughput. Each user requests an allocation for the amount of traffic the user expects. The packets are then time stamped and placed in a queue according to the value of their time stamp. One drawback to this method is there is no way to detect or correct errors. VC schedulers have a tight delay bound that is independent of the number of sessions involved in order to provide for delay minimization, however, VC schedulers do not allocate available bandwidth as fairly as some other schedulers.

Self Clocked Fair Queuing (SCFQ) schedulers as well as Start Time Fair Queuing (STFQ) schedulers have a high degree of fairness for allocating bandwidth. However, they do not have the desired delay minimization since the virtual time is not strictly monotonically increasing, and their delay bounds are proportional to the number of sessions involved. DRRFQ schedulers have a degree of fairness but are less effective when load balancing or distributed queues are used.

Other types of PFQ schedulers, such as Worst-case Fair Weighted Fair Queuing ($WF^2Q$), Worst Case Fair Weighted Fair Queuing Plus ($WF^2Q+$) and Packetized Generalized Processor Sharing (PGPS) offer better performance but are more costly to implement than the SCFQ, STFQ and DRRFQ schedulers.

The $WF^2Q$ and $WF^2Q+$ schedulers have both a high degree of fairness, effectively minimize scheduling delay through the scheduler and have a tight delay bound that is independent of the number of sessions involved. The implementation costs of $WF^2Q$ and $WF^2Q+$ schedulers however are high compared to other schedulers since the $WF^2Q$ and $WF^2Q+$ schedulers must perform two searches on each session, one search for determining the packet start times of the first packet in each session and another search for determining the packet start times of the backlogged packets in each session. Other schedulers typically perform only a single search of the first packet of each session to determine the packet start times for each such packet.

PGPS schedulers are similar to the $WF^2Q$ and $WF^2Q+$ schedulers, especially when utilizing packets having a small packet size, however the PGPS schedulers are better at minimizing worst-case session delay; that is, the amount of time a session has to wait before it can schedule a packet for transfer.

Accordingly, it would be desirable to have a scheduler which is cost effective to implement and which is capable of scheduling the transmission of packets from different sessions such that the individual demands on throughput and delay can be met in a fair and efficient manner.

BRIEF SUMMARY OF THE INVENTION

A packet scheduler is disclosed which provides a high degree of fairness in scheduling packets associated with different sessions. The scheduler also minimizes packet delay for packet transmission from a plurality of sessions which may have different requirements and may operate at different transfer rates. When a packet is received by the scheduler, the packet is assigned its own packet virtual start time based on whether the session has any pending packets and the values of the virtual finish time of the previous packet in the session and the packets arrival time. The scheduler then determines a virtual finish time of the packet by determining the transfer time required for the packet based upon its length and rate and by adding the transfer time to the packet virtual start time of the packet. The packet with the smallest virtual finish time is then scheduled for transfer. By selecting packets for transmission in the above described manner, the available bandwidth may be shared in pro-rata proportion to the guaranteed session rate, thereby providing a scheduler with a high degree of fairness while also minimizing the amount of time a packet waits in the scheduler before being served.

BRIEF DESCRIPTION OF THE SEVERAL VIEWS OF THE DRAWING

The invention will be more fully understood from the following detailed description taken in conjunction with the accompanying drawings in which:

FIG. 8 is a table illustrating the traffic composition for the results of the five tests illustrated in FIGS. 3–8.

DETAILED DESCRIPTION OF THE INVENTION

Figure 1:
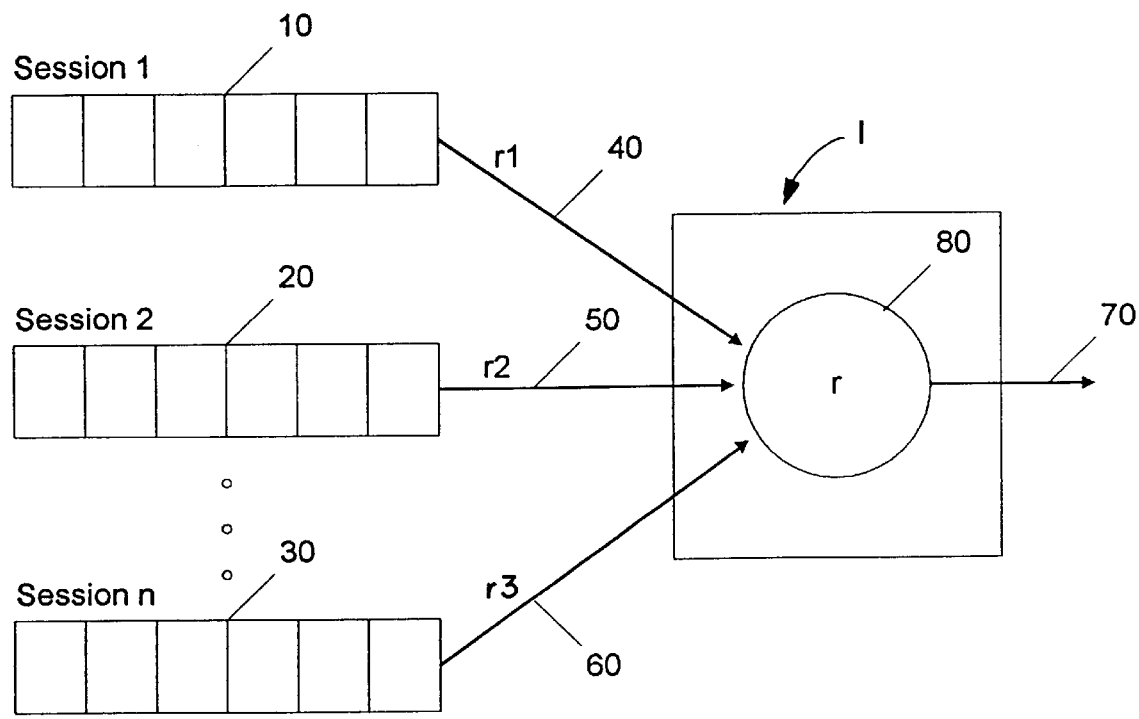
FIG. 1 is a block diagram of a scheduler in accordance with the present invention.

A Start Time Clocked Fair Queuing (STCFQ) scheduler 1 in accordance with the present invention is shown in FIG. 1.

The scheduler 1 has inputs for receiving packets for multiple sessions 10, 20, 30. Each of the sessions has a respective transfer rate $r_1$ 40, $r_2$ 50, and $r_3$ 60. The scheduler further includes inputs for receiving a packet belonging to one of the sessions and an output 70. While only three sessions 10, 20, and 30 are presently illustrated for purposes of explanation, the scheduler 1 can receive inputs corresponding to more sessions.

Packets in multiple sessions 10, 20, 30 having transfer rates $r_1$, $r_2$, $r_n$ respectively, must be scheduled so that throughput and delay criteria can be met in a fair and efficient manner. A single channel supports a session having a transfer rate r, measured in bits per second. The scheduler schedules the transmittal of packets generated from n different sessions. The transfer rate of each session has a transfer rate which may differ from the transfer rates of the other sessions. Once the scheduler finishes transferring a packet from a session, the scheduler then begins serving another packet from either the same session or a different session.

In the illustrative example, session 1 needs a throughput of $r_1$, session 2 needs a throughput of $r_2$ and session n needs a throughput of $r_N$. Rate $r_1$ may be at a similar or different rate than $r_2$. The presently disclosed scheduler assures the respective throughputs $r_1, r_2, \ldots r_N$ by sharing the available bandwidth of the output channel 70 in proportion to the respective sessions needed transfer rates. The condition $r_1+r_2+\ldots+r_N \leq r$ must be satisfied to assure the respective throughputs $r_1, r_2, \ldots r_N$. The STCFQ scheduler is work-conserving in that the scheduler always schedules a packet transmission as long as at least one session is not empty. The bandwidth which would have been allocated for an empty session is distributed among active sessions proportional to their respective rates.

As an example, assume that rate $r_1$ is 10 megabytes/sec (Mbps), that rate $r_2$ is 20 Mbps, that $r_n=r_3$ and that rate $r_3$ is 30 Mbps. Further assume that the output 70 has 100 Mbps bandwidth. The summation of all the input rates is 10 Mbps +20 Mbps+30 Mbps=60 Mbps. Since the output bandwidth is 100 Mbps, the available bandwidth is the output rate minus the summation of the input rates; i.e. 100 Mbps–60 Mbps=40 Mbps. This available bandwidth is divided up among the three sessions in proportion to their respective transfer rates. Thus, the bandwidth allocated to session 1 is:

$$r_1 + (\text{available bandwidth} * r_1 / \text{summation}) =$$
$$10 + (40*10/60) = 17 \text{Mbps}$$

the bandwidth allocated to session 2 is:

$$r_2 + (\text{available bandwidth} * r_2 / \text{summation}) =$$
$$20 + (40*20/60) = 32 \text{Mbps}$$

and the bandwidth allocated to session 3 is:

$$r_N + (\text{available bandwidth} * r_N / \text{summation}) =$$
$$30 + (40*30/60) = 50 \text{Mbps}$$

Thus, the available bandwidth is divided among the sessions in a weighted manner, such that the sessions with the higher transfer rates receive a concomitant larger proportion of the available bandwidth.

One prior art scheduler divides any additional available bandwidth equally among the sessions. Using the example transfer rates above, the prior art scheduler would allocate bandwidth according to the following formula:

$$\text{session } 1 = r_1 + (\text{available bandwidth} / \text{number of sessions})$$
$$10 + (40/3) = 23.3 \text{ Mbps}$$
$$\text{session } 2 = r_2 + (\text{available bandwidth} / \text{number of sessions})$$
$$20 + (40/3) = 33.3 \text{ Mbps}$$
$$\text{session } 3 = r_3 + (\text{available bandwidth} / \text{number of sessions})$$
$$30 + (40/3) = 43.3 \text{ Mbps}$$

While in the prior art scheduler the allocation is simple to implement, the available bandwidth is equally divided among the remaining sessions, instead of being divided in proportion to the assigned rates. Thus the prior art scheduler does not achieve the fairness of the presently disclosed STCFQ scheduler.

Further, if session 2 were eliminated, the bandwidth allocated by the STCFQ scheduler would be as follows:

$$\text{session } 1 = r_1 + (\text{available bandwidth} * r_1 / \text{summation})$$
$$10 + (60*10/40) = 25 \text{ Mbps}$$
$$\text{session } 3 = r_3 + (\text{available bandwidth} * r_1 / \text{summation})$$
$$30 + (60*30/40) = 75 \text{ Mbps}.$$

The bandwidth allocated by the prior art scheduler would result in:

$$\text{session } 1 = r_1 + (\text{available bandwidth} / \text{number of sessions})$$
$$10 + (60/2) = 40 \text{ Mbps}$$
$$\text{session } N = r_N + (\text{available bandwidth} / \text{number of sessions})$$
$$30 + (60/2) = 60 \text{ Mbps}$$

Thus, in the STCFQ scheduler the faster session is allocated a larger portion of the additional available bandwidth since the STCFQ scheduler takes in to consideration the transfer rate and the packet length as part of the determination of the packet virtual finish time of the packet then schedules the packets according to their virtual finish times. As such, a high degree of utilization of available bandwidth is achieved.

Figure 2A:
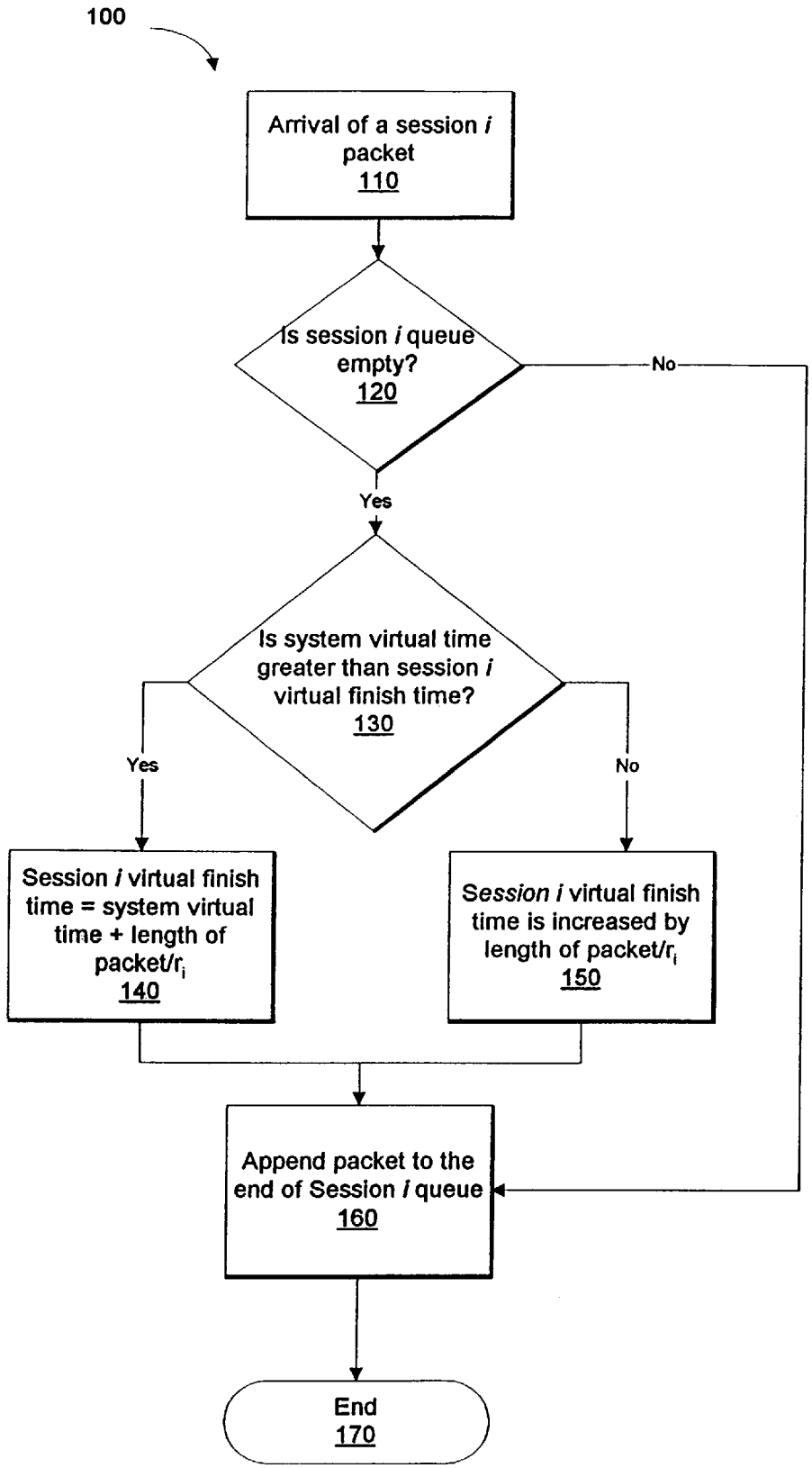
FIGS. 2a–2b show a flow chart illustrating the method employed in the presently disclosed scheduler.
Figure 2B:
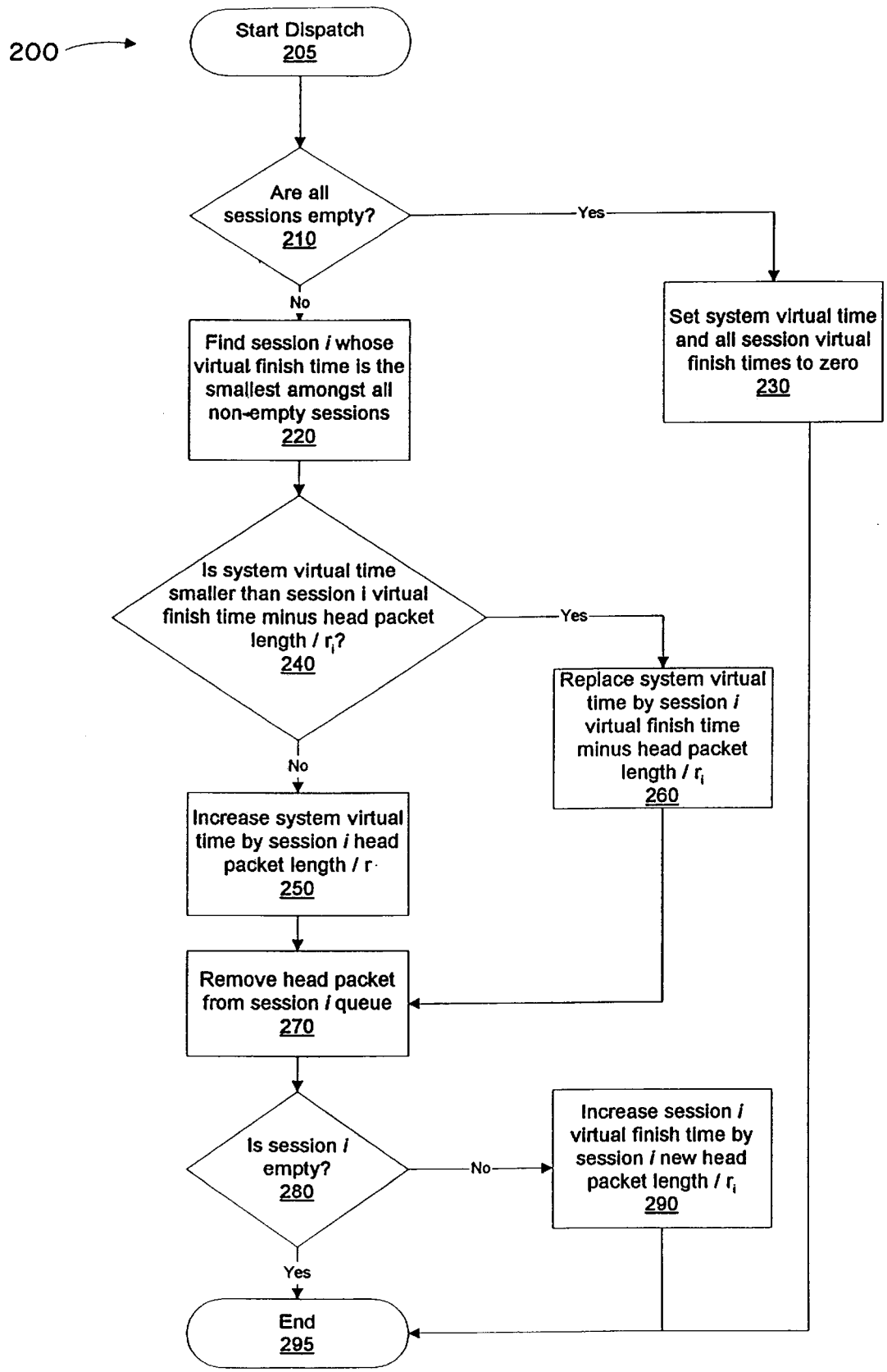
Figure 3B:
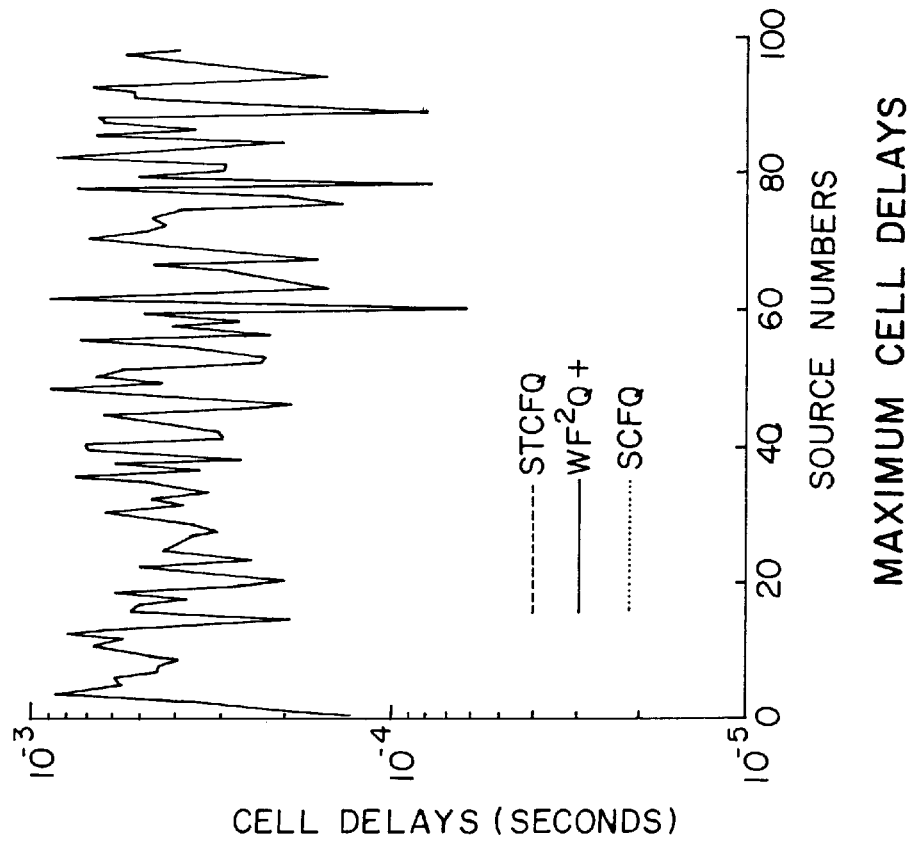
FIG. 3 is a set of graphs illustrating results of a first test of the three schedulers.
Figure 3A:
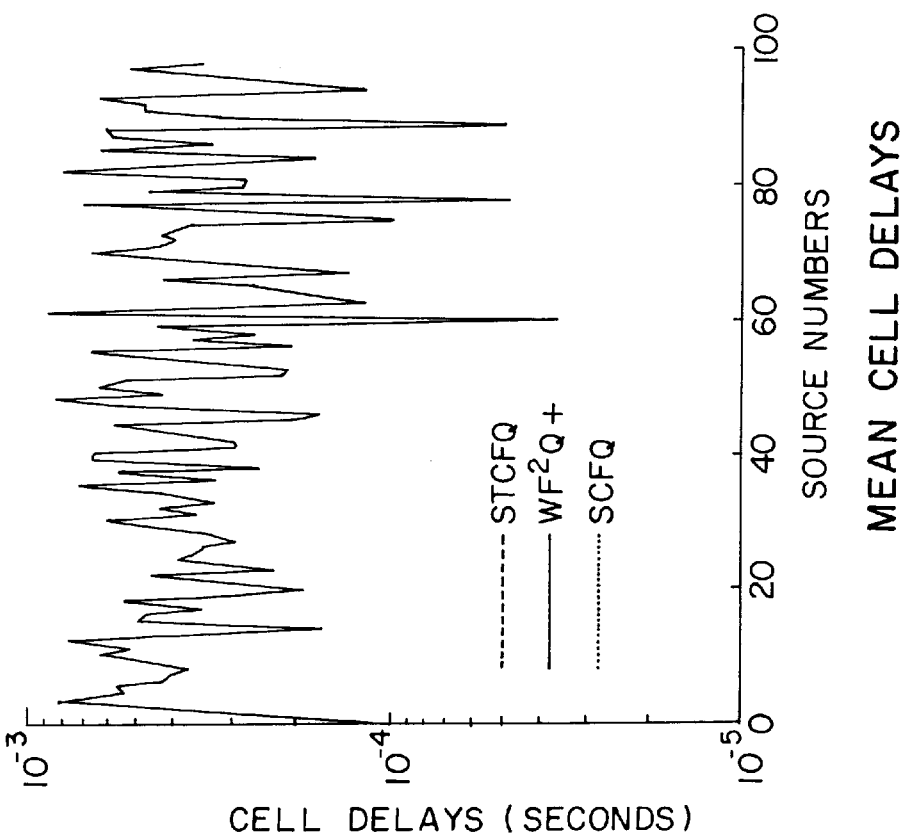

FIGS. 2a and 2b illustrate the method employed in the presently disclosed STCFQ scheduler which includes two basic operations: Enqueue() and Dispatch (). The Enqueue() operation 100 updates the virtual finish time of a session i (if necessary) and appends the packet to the end of the session i queue. Operation Dispatch () 200, shown in FIG. 2b, is executed whenever the scheduler is ready to schedule the next packet for transmission. It should be noted that the scheduler is not a channel or a link and therefore is not responsible for packet transmission. For this reason, it is possible that operation Dispatch () is being executed while some other packet is being transmitted by the link.

Associated with the scheduler is the system virtual time. In addition, each session has its own virtual finish time, which is equal to the virtual finish time of the packet at the head of the session i queue. Initially, the system virtual time and the virtual finish time of each session are set to zero.

Referring now to FIG. 2a, the Enqueue(i) operation 100 is activated when a session i packet arrives, as shown in step 110. When the packet is received the packet arrival time of the received packet is set to the current value of the system virtual time. A determination of the packet virtual finish time is performed next. The transfer time of the packet is determined by dividing the packet length by the packet transfer rate. The packet transfer time is added to the packet virtual start time in order to obtain the packet virtual finish time.

At step 120 a determination is made if the session i queue is empty. If there are other packets in the session i queue, then the current packet is appended to the end of the session i queue, as shown in step 160 and the Enqueue(i) operation is complete, as shown in step 170. If the session i queue is empty then, as shown in step 130, the system virtual time is compared with the virtual finish time of session i (the virtual finish time of the last packet of session i transmitted prior to the arrival of this new packet). As shown in step 140, if the system virtual time is greater than the virtual finish time of session i, then the virtual finish time of session i is replaced by the system virtual time plus the packet length divided by the rate allocated to session i. Otherwise, as shown in step 150, the virtual finish time of session i is increased by the packet length divided by the rate allocated to session i. Next the current packet is appended to the end of the session i queue, as shown in step 160 and the Enqueue(i) operation is complete, as shown in step 170.

Referring now to FIG. 2b, the Dispatch () operation 200 is shown. When the scheduler is ready to schedule another packet for transmission, the Dispatch () operation 200 is executed, as shown in step 205. As shown in step 210, a determination is made if all the session queues are empty. If all the session queues are empty then the system virtual time and the virtual finish times of all sessions are set to zero, as shown in step 230. The Dispatch () operation is then finished, as shown in step 295. If there are one or more sessions whose queue is not empty, then the scheduler determines which session (session i) has the smallest virtual finish time among all the sessions which have a pending packet, as shown in step 220. At step 240, the scheduler determines if the system virtual time is less than the session i virtual finish time minus the session i head packet length divided by the allocated rate. If this is true then, as shown in step 260, the system virtual time is replaced by the session i virtual finish time minus the session i head packet length divided by the allocated rate. If the system virtual time is not less than the session i virtual finish time minus the session i head packet length divided by the allocated rate the system virtual time is increased by the session i head packet length divided by the allocated rate as shown in step 250. After completion of steps 250 or 260 the session i head packet is removed from the session i queue, as shown in step 270. The scheduler then, as shown at step 280, determines if the session i queue is empty. If the session i queue is empty then the Dispatch () operation is finished, as shown in step 295. If the session i queue is not empty, step 290 increases the session i virtual finish time by the session inn new head packet length divided by the rate allocated to session i. The Dispatch () operation is then finished, as shown in step 295.

Accordingly, for the STCFQ scheduler the system virtual time, which is used as part of the determination of when the packets are scheduled for transfer, always keeps up with the virtual start time of the packet being served.

Referring now to FIGS. 3–7, simulation results for the STCFQ scheduler are presented along with those for SCFQ and $WF^2Q+$ schedulers. In all the simulations runs, three classes of sources are used: a Constant Bit Rate (CBR) source which is deterministic, a real time Variable Bit Rate (rtVBR) source, and Available Bit Rate (ABR) source utilizing Poisson processes. The mean rates of all the ABR sources are intentionally made much larger than their respective guaranteed throughput so that there will always be ABR cells available in the system to use the spare bandwidth from real time connections such as CBR and rtVBR, thereby resulting in a link utilization of 100%.

The three schedulers are compared under a flat scheduling structure as shown in FIG. 1. In flat scheduling a single scheduler (either SCFQ, $WF^2Q+$, or STCFQ) is used for all connections.

Results of five simulation tests are shown in FIGS. 3–7, each representing a particular traffic scenario of interest. In the first two tests, all connections are homogeneous. In test #3, three different types of sources are used while in both tests #4 and #5 more than 10 different types of sources are used. The composition or traffic and other system parameters of the five tests are shown in the table of FIG. 8. For example, in Test #3, 130 sources (source number 0–99 are VBR1, number 100 to number 119 are VBR4, and number 120 to number 129 are ABR1) share a total of 82.5 Mbps bandwidth.

For each test shown in FIGS. 3–7, two graphs, (a) and (b), are plotted. In the (a) graph, the mean cell delay (sum of cell delays divided by the number of cells transmitted during the simulation run) of each connection (source) is given for each of the three schedulers. In the (b) graph, the maximum delay (the largest cell delay recorded during the simulation run) of each connection is given for each of the three schedulers. It should be noted that FIG. 8 can be used to identify the source type of each connection in the figures. For example, source #45 in Test #1 (FIG. 3) is a CBR1 source while source #106 in Test #3 (FIG. 5) is a VBR4 source.

Figure 4B:
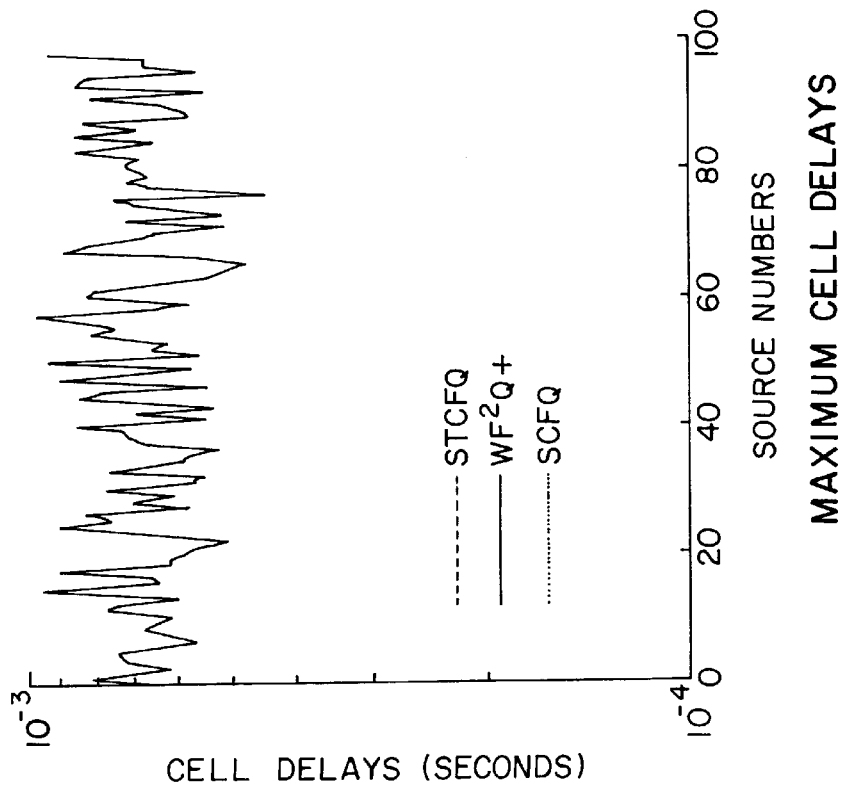
FIG. 4 is a set of graphs illustrating results of a second test of three schedulers.
Figure 4A:
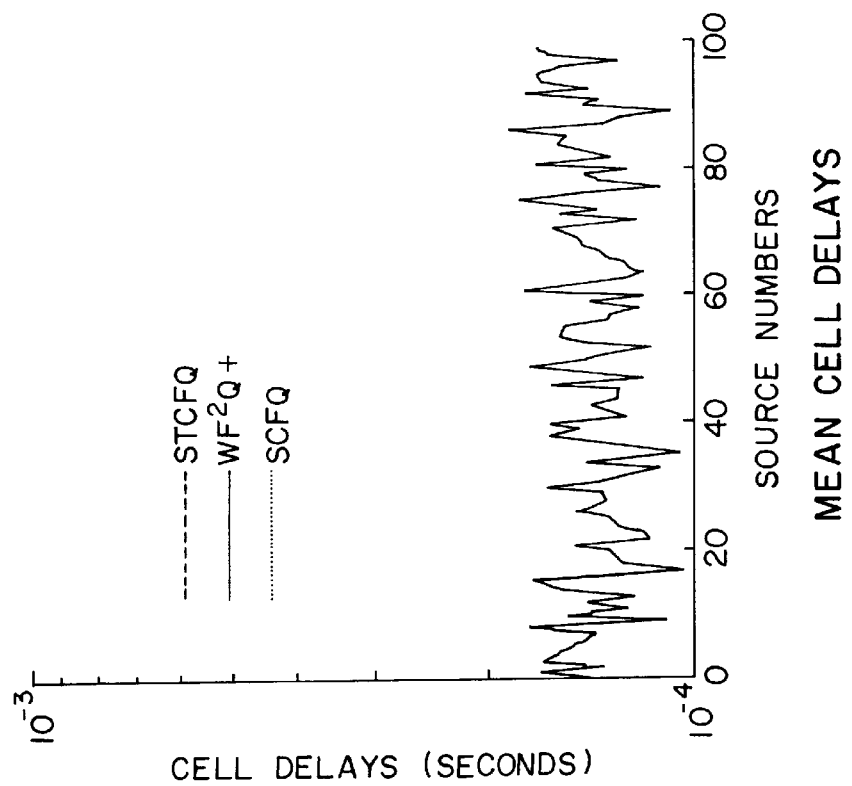

From FIG. 8, it can be seen that in Test #1 100 CBR1 connections (each with a peak rate of 64 Kbps) share a single link of capacity 6.4 Mbps (link utilization=100%). as illustrated in FIG. 4, cell delays (both mean and maximum) are identical under the three scheduling schemes for all connections since all connections have the same scheduling interval and for this reason all three schemes behave the same. Additionally, the maximum delays are very close to the mean delays of most of the connections due to the periodic nature of the CBR traffic.

In test #2 (FIG. 4), 100 VBR1 (voice) connections share a single link of capacity 3.44 Mbps (link utilization=64%). Here again, the delays (both mean and maximum) are identical under the three schedulers for all connections since they have the same scheduling interval and all three schedulers behave the same in this scenario. However, unlike Test #1, the maximum delays are much larger than the mean delays due to the variable nature of the VBR traffic.

Figure 5B:
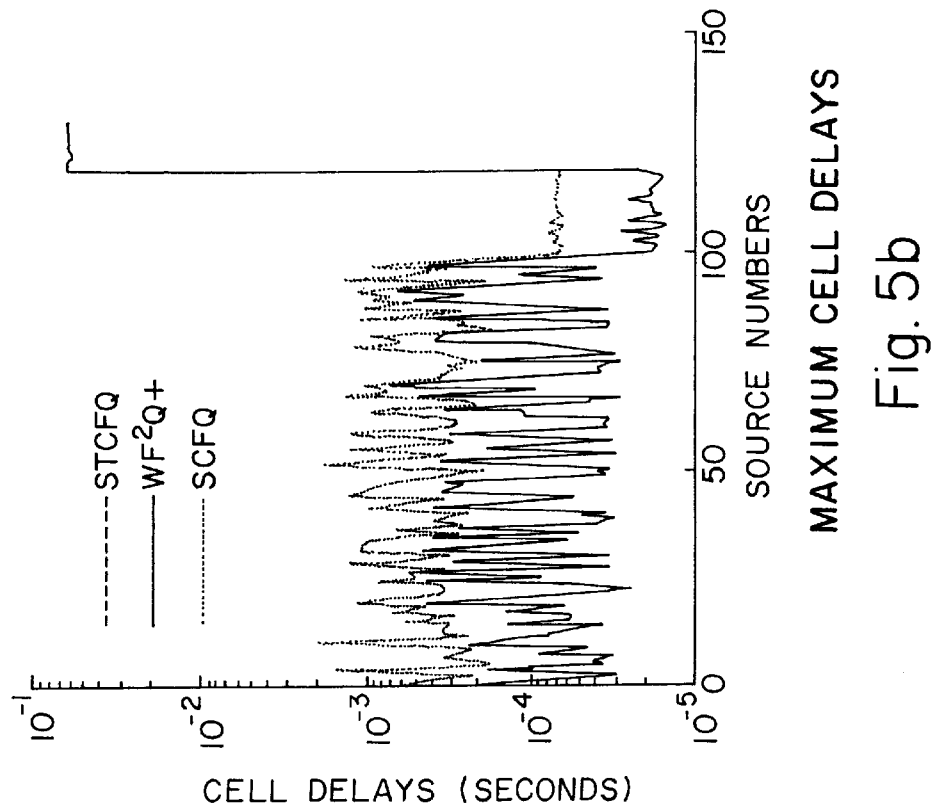
FIG. 5 is a set of graphs illustrating results of a third test of three schedulers.
Figure 5A:
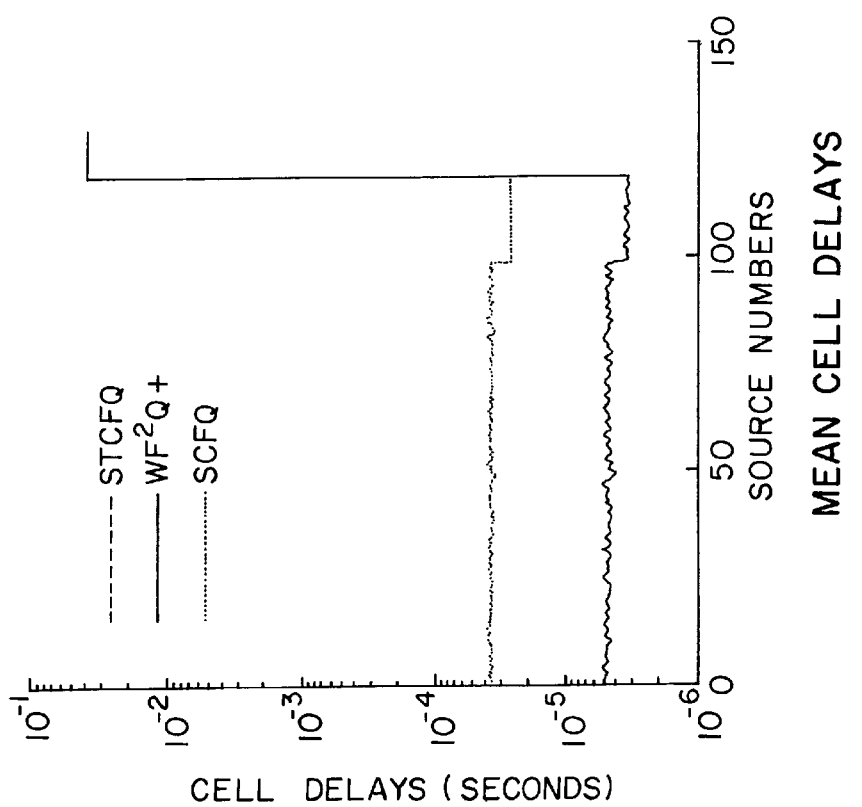

Test #3 (FIG. 5) has 100 VBR1, 20 VBR4 and 10 ABR1 connections sharing a single link of 82.5 Mbps. The average rate of the ABR1 sources are relatively large (10 Mbps each), resulting in a link utilization of 100%. As shown in FIG. 5, the 120 VBR connections are protected from the overloading by the 10 ABR sources. In this test the advantages of $WF^2Q+$ and STCFQ over SCFQ are apparent, the delay performance (both the mean and the maximum) of $WF^2Q+$ and STCFQ is almost identical and is significantly better than that of the SCFQ.

Figure 6B:
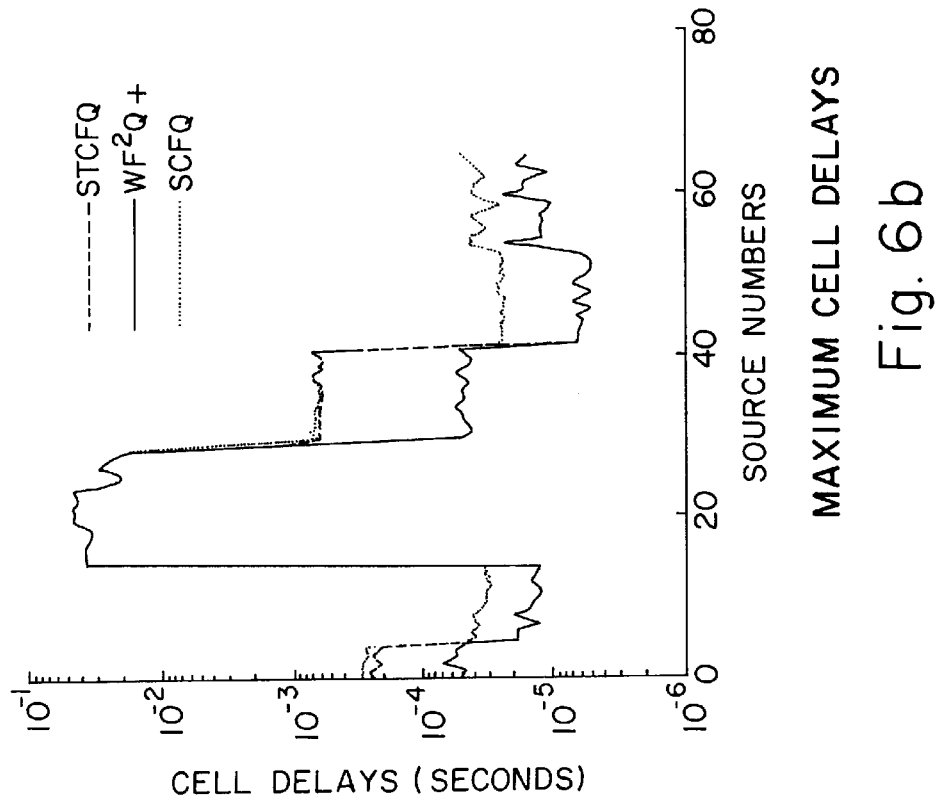
FIG. 6 is a set of graphs illustrating results of a fourth test of three schedulers.
Figure 6A:
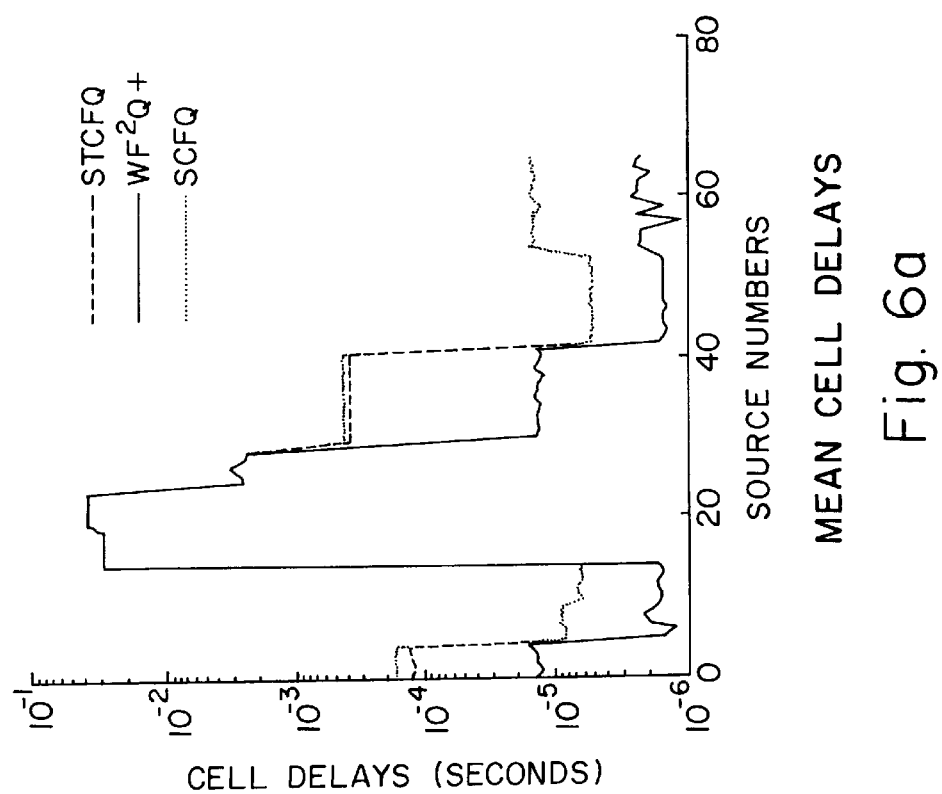
Figure 7B:
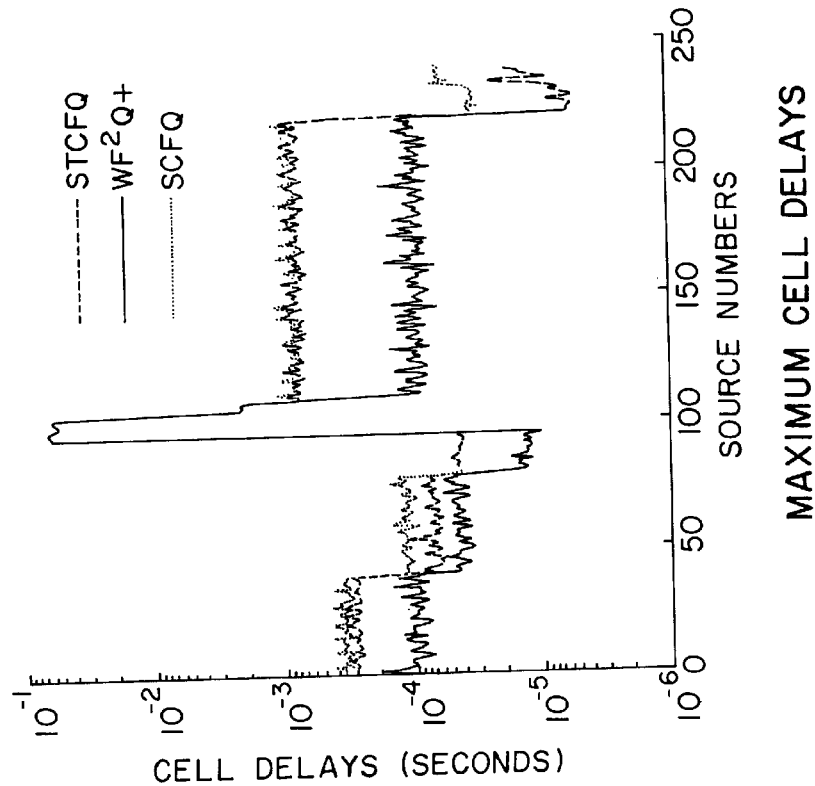
FIG. 7 is a set of graphs illustrating results of a fifth test of three schedulers.
Figure 7A:
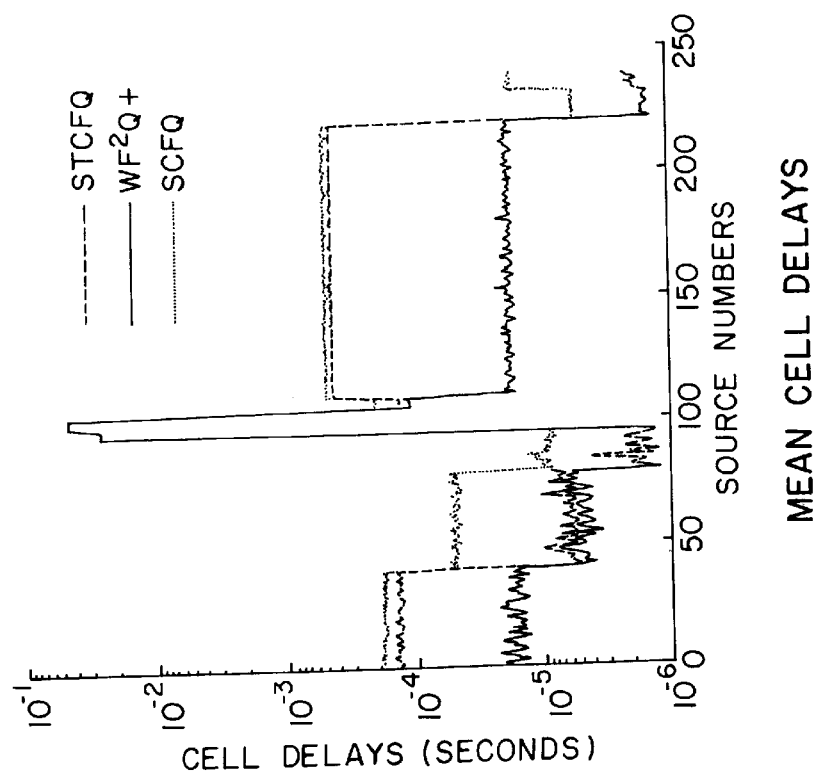

As the traffic mixture becomes more complicated in Test #4 and Test #5 (FIGS. 6 and 7 respectively) the advantages of both $WF^2Q+$ and STCFQ become more visible. In FIGS. 6 and 7, it is apparent that the $WF^2Q+$ offers significantly better delay performance for all CBR and VBR connections than SCFQ does. The WF$^2$Q+ is better than the STCFQ only for low throughput (64 Kbps) connections (e.g., CBR1, VBR1, VBR2, and VBR3) and the two have nearly the same delay performance for other connections.

Therefore, the STCFQ scheduler is clearly better than the SCFQ scheduler with respect to delay performance for real time connections and it is nearly as good as the WF$^2$Q+ except for low throughput connections, while being more cost effective to implement than the WF$^2$Q+ scheduler.

Figure 9A:
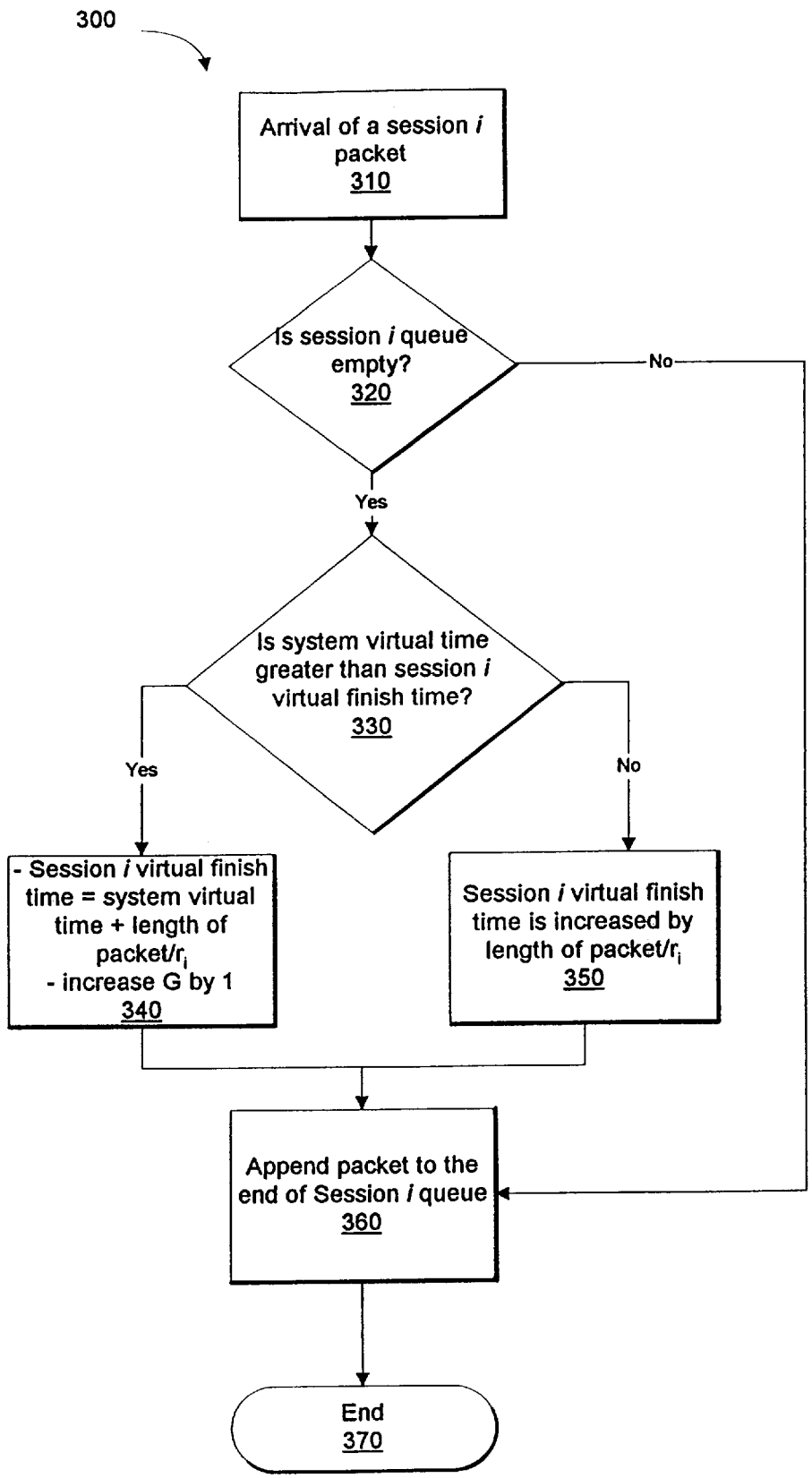
FIGS. 9a–9b how a flow chart illustrating an additional method which may be employed in the scheduler in accordance with the present invention.
Figure 9B:
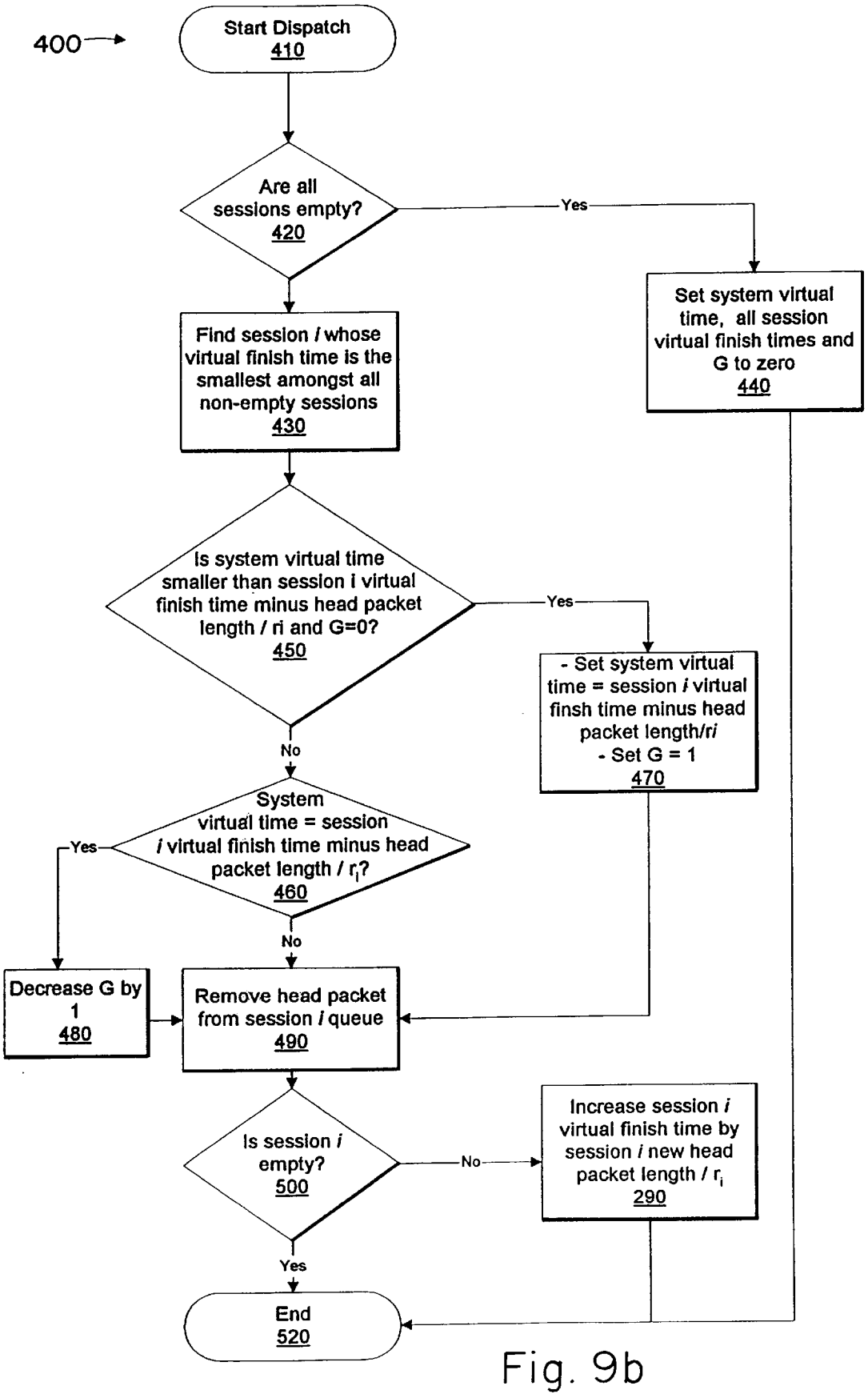

FIGS. 9a and 9b illustrate the method employed in the presently disclosed Minimum Start Time Clocked Fair Queuing Plus MSTCFQ+ scheduler. This scheduler includes two basic operations Enqueue(i) and Dispatch() . The Enqueue(i) operation 300 updates the virtual finish time of a session i (if necessary) and appends the packet to the end of the session i queue. Operation Dispatch () 400, shown in FIG. 9b, is executed whenever the scheduler is ready to schedule the next packet for transmission. It should be noted that the scheduler is not a channel or a link and therefore is not responsible for packet transmission. For this reason, it is possible that operation Dispatch () is being executed while some other packet is being transmitted by the link.

Associated with the scheduler is the system virtual time. In addition, each session has its own virtual finish time, which is equal to the virtual finish time of the packet at the head of the session i queue and further includes a counter G that keeps track of the number of packets whose virtual start time is the same as the system virtual time. Counter G is used to decide when to increase the system virtual time. Initially, the system virtual time, the virtual finish time of each session and the counter G are set to zero.

Referring now to FIG. 9a, the Enqueue(i) operation 300 is activated when a session i packet arrives, as shown in step 310. When the packet is received the packet arrival time of the received packet is set to the current value of the system virtual time. A determination of the packet virtual finish time is performed next. The transfer time of the packet is determined by dividing the packet length by the packet transfer rate. The packet transfer time is added to the packet virtual start time in order to obtain the packet virtual finish time.

At step 320 a determination is made if the session i queue is empty. If there are other packets in the session i queue, then the current packet is appended to the end of the session i queue, as shown in step 360 and the Enqueue(i) operation is complete, as shown in step 370. If the session i queue is empty then, as shown in step 330, the system virtual time is compared with the virtual finish time of session i (the virtual finish time of the last packet of session i transmitted prior to the arrival of this new packet). As shown in step 340, if the system virtual time is greater than the virtual finish time of session i, then the virtual finish time of session i is replaced by the system virtual time plus the packet length divided by the rate allocated to session i and the value of G is incremented. Otherwise, as shown in step 350, the virtual finish time of session i is increased by the packet length divided by the rate allocated to session i. Next the current packet is appended to the end of the session i queue, as shown in step 360 and the Enqueue(i) operation is complete, as shown in step 370.

Referring now to FIG. 9b, the Dispatch () operation 400 is shown. When the scheduler is ready to schedule another packet for transmission, the Dispatch () operation 400 is started, as shown in step 410. As shown in step 420, a determination is made if all the session queues are empty. If all the sessions are empty then the system virtual time, the virtual finish times of all sessions and counter G are set to zero, as shown in step 440. The Dispatch () operation is then finished, as shown in step 520. If there are one or more sessions whose queue is not empty, then the scheduler determines which session (session i) has the smallest virtual finish time among all the sessions which have a pending packet, as shown in step 430. At step 450, the scheduler determines if the system virtual time is less than the session i virtual finish time minus the session i head packet length divided by the allocated rate and if G=0. If this is true then, as shown in step 470, the system virtual time is replaced by the session i virtual finish time minus the session i head packet length divided by the allocated rate and G is set to 1. At step 460, if the system virtual time is equal to the session i virtual finish time minus the session i head packet length divided by the allocated rate than G is decreased by 1. If the determination in step 460 is not true or after the completion of step 470 or 480 the session i head packet is removed from the session i queue, as shown in step 490. The scheduler then, as shown at step 500, determines if the session i queue is empty. If the session i queue is empty then the Dispatch () operation is finished, as shown in step 520. If the session i queue is not empty, step 510 increases the session i virtual finish time by the session i new head packet length divided by the rate allocated to session i. The Dispatch () operation is then finished, as shown in step 520.

The STCFQ and MSTCFQ+ schedulers provide a high degree of fairness and delay minimization which are necessary for scheduling packets from multiple sessions each of which may have different characteristics and correspondingly different requirements. This high level of fairness and delay minimization are achieved since the available bandwidth of the scheduler is distributed among sessions requiring service according to the virtual start time of the packet, the transfer rate of the session and the length of the packet.

Additionally, the STCFQ and MSTCFQ+ schedulers are inexpensive to implement.

Having described preferred embodiments of the invention it will now become apparent to those of ordinary skill in the art that other embodiments may be used. Accordingly, it is submitted that the invention should not be limited to the described embodiment but rather should be limited only by the spirit and scope of the appended claims.

We claim:

1. A method for scheduling packet transmission in a network communications device comprising the steps of:

determining a system virtual time;

receiving at least one packet associated with a session, each packet having a packet length in bits and a packet rate, each session having a session virtual finish time;

determining for each of said at least one packet a packet arrival time, a packet transfer time, and a packet virtual finish time;

setting the packet arrival time for each of said at least one packet to the current value of the system virtual time;

determining the packet virtual start time for each of said at least one packet;

dividing the packet length by the packet rate to obtain the packet transfer time for each of said at least one packet;

summing the packet virtual start time and the packet transfer time to obtain the packet virtual finish time for each of said at least one packet;

determining which one of said received at least one packet has the smallest packet virtual finish time;

moving said packet into a queue associated with said session if said queue is empty;

updating the session virtual finish time if said queue associated with said session is not empty and moving said packet into said queue associated with said session;

setting the system virtual time and all session virtual finish times to zero if all sessions are empty;

determining which session has the smallest virtual finish time among all sessions which have a pending packet;

updating the system virtual time when the system virtual time is less than the session virtual finish time minus the packet transfer time by setting the system virtual time to the session virtual finish time minus the packet transfer time, and when the system virtual time is not less than the session virtual finish time minus the packet transfer time by adding the packet transfer time to the system virtual time;

transmitting the packet having the smallest packet virtual finish time; and updating the session virtual finish time if the session has a pending packet.

2. The method of claim 1 wherein the step of updating the session virtual finish time if said queue associated with said session is not empty comprises the step of setting the session virtual finish time equal to the packet virtual finish time if the system virtual time is greater than the session virtual finish time.

3. The method of claim 1 wherein the step of updating the session virtual finish time if said queue associated with said session is not empty comprises the step of adding the packet virtual finish time to the session virtual finish time if the system virtual time is not greater than the session virtual finish time.

4. The method of claim 1 wherein said step of updating the session virtual finish time if the session has a pending packet further comprises the step of increasing the session virtual finish time by the packet transfer time of the next packet pending in the session.

5. A method for scheduling packet transmission in a network communications device comprising the steps of:

determining a system virtual time;

initializing a counter when the network communications device is initialized;

receiving at least one packet associated with a session, each packet having a packet length in bits and a packet rate, each session having a session virtual finish time;

determining for each of said at least one packet a packet arrival time, a packet transfer time, and a packet virtual finish time;

setting the packet arrival time for each of said at least one packet to the current value of the system virtual time;

determining the packet virtual start time for each of said at least one packet;

dividing the packet length by the packet rate to obtain the packet transfer time for each of said at least one packet;

summing the packet virtual start time and t he packet transfer time to obtain the packet virtual finish time for each of said at least one packet;

determining which one of said received at least one packet has the smallest packet virtual finish time;

moving said packet into a queue associated with a session if queue is empty;

updating the session virtual finish time if said queue associated with said session is not empty and moving said packet into said queue associated with session;

setting the system virtual time and all session virtual finish times to zero if all sessions are empty;

determining which session has the smallest virtual finish time among all sessions which have a pending packet;

updating the system virtual time when the system virtual time is less than the session virtual finish time minus the packet transfer time by setting the system virtual time to the session virtual finish time minus the packet transfer time, and when the system virtual time is not less than the session virtual finish time minus the packet transfer time by adding the packet transfer time to the system virtual time, and when the system virtual-time is less than the session virtual finish time minus the packet transfer time and the counter is equal zero by setting the system virtual time to the session virtual finish time minus the packet transfer time and setting the counter to value of one, and when the system virtual time is equal to the session virtual time minus the packet transfer time and the counter does not equal a value zero by decrementing the counter;

transmitting the packet having the smallest packet virtual finish time; and updating the session virtual finish time if the session has a pending packet.

6. The method of claim 5 further comprising the step of setting the counter to zero if all sessions are empty.

7. The method of claim 5 wherein the step of updating the session virtual finish time if said queue associated with said session is not empty comprises the steps of setting the session virtual finish time equal to the packet virtual finish time and incrementing the counter if the system virtual time is greater than the session virtual finish time.

8. The method of claim 5 wherein the step of updating the session virtual finish time if said queue associated with said session is not empty comprises the step of adding the packet virtual finish time to the session virtual finish time if the system virtual time is not greater than the session virtual finish time.

9. The method of claim 5 wherein said step of updating the session virtual finish time if the session has a pending packet further comprises the step of increasing the session virtual finish time by the packet transfer time of the next packet pending in the session.

* * * * *